United States Patent [19]

Brunson et al.

[11] Patent Number: 4,486,844
[45] Date of Patent: Dec. 4, 1984

[54] DUAL AXIS INCLINATION MEASURING APPARATUS AND METHOD

[75] Inventors: Amber N. Brunson; Deighton E. Brunson, both of Independence; Walter W. Ray, Jr., Kansas City, all of Mo.

[73] Assignee: Brunson Instrument Company, Kansas City, Mo.

[21] Appl. No.: 381,546

[22] Filed: May 24, 1982

[51] Int. Cl.³ ............................................. G01C 9/06
[52] U.S. Cl. ................................. 364/559; 33/366; 73/1 E
[58] Field of Search ............... 364/550, 556, 559, 570, 364/575; 73/1 E; 33/366 C

[56] References Cited

U.S. PATENT DOCUMENTS 2,592,941  4/1952  Moore .
2,711,490  6/1955  Wilcox .
2,936,411  5/1960  Doty .
3,009,255  11/1961  Robillard .
3,059,343  10/1962  Kermode .
3,286,357  11/1966  Grumman .
3,421,227  1/1969  Turner et al. .
3,483,266  4/1969  Carow et al. .
3,486,238  12/1969  Hansen .
3,496,565  2/1970  Jenkins ................................. 364/559
3,576,124  4/1971  O'Connor ............................. 73/1 E
3,633,003  1/1972  Talwani ................................ 364/559
3,823,486  7/1974  Bhat .
3,911,592  10/1975  Crask .
4,022,284  5/1977  Crow .
4,028,815  6/1977  Buckley et al. .
4,077,132  3/1978  Erickson .
4,085,375  4/1978  Galuschak .
4,094,073  6/1978  Parra .
4,167,818  9/1979  Cantarella et al. .

OTHER PUBLICATIONS

*Computer System Architecture* M. Mano; Prentice Hall Englewood Cliffs, N.J. 07632, 1982, pp. 110–112, 129–130.
*The Bugbook* I Peter Rony et al., E&L Instruments Derby Conn. 06418, 1974, 5-33-35.

Primary Examiner—Raulfe B. Zache
Assistant Examiner—Dale M. Shaw
Attorney, Agent, or Firm—Litman, Day and McMahon

[57] ABSTRACT

A dual axis inclination measuring system includes a sensor unit for placement on a surface to determine the inclination of the surface with respect to two mutually perpendicular horizontal axes and an indicator unit connected to the sensor unit and operative to process signals generated by the sensor unit to determine and indicate the inclination of the test surface. The sensor unit includes a dual axis sensor element which cooperates with circuits for generating signals having voltage levels proportional to the inclination of the sensor. The indicator unit includes an analog-to-digital converter operative to convert the voltage levels to digital words and a digital computer operative to calculate angle readings from the digital words. The computer includes a look-up table of a plurality of the digital words stored in a memory of the computer and is calibrated exclusively to the particular sensor with which the computer is used, thereby providing great accuracy.

22 Claims, 5 Drawing Figures

DUAL AXIS INCLINATION MEASURING APPARATUS AND METHOD

FIELD OF THE INVENTION

The present invention relates to inclination sensing instruments and, more particularly, to a dual axis, computer controlled, electronic inclination measuring system.

BACKGROUND OF THE INVENTION

Instruments for determining true horizontal and vertical range from the carpenter's level and plumb bob which have been used nearly since antiquity through precise opto-mechanical instruments, such as optical transit squares, to electro-mechanical instruments such as gyroscopes. Each type of instrument is adequate for a given application with regard to required precision, speed of measurement, and convenience. The majority of the simpler inclination indicating instruments do not provide a quantitative indication of inclination, but merely whether or not a test surface is level. Such an indication is adequate for constructing relatively small structures, such as residential buildings of several stories or less. However, much greater accuracy is required for building relatively large structures such as skyscrapers, oceangoing vessels and the like.

For the greater accuracy required in building relatively large structures, optical tooling instruments are often used, such as optical transit squares, by means of which critical points, planes, and surfaces are observed through precise telescopes and related to reference lines or planes. While much greater accuracy can be achieved with such instruments, the actual use of such instruments can be very time consuming. Another disadvantage of such instruments is that their usefulness is decreased in moving frames of reference such as on a ship or floating platform at sea.

The use of electrical sensors in cooperation with Wheatstone bridges, Maxwell bridges, and other types of bridge circuits in inclination measuring instruments provides more convenience in determination of inclination without sacrificing accuracy greatly. Most such bridge circuits have been employed with analog type meters which have generally non-linear response across the scales thereof and which have a maximum accuracy of about three percent. For this reason, when used with analog type meters, nulling, zeroing, and bridge balancing techniques are generally employed for greatest accuracy. This requires adjusting and reading calibrated dials or switching decade type resistors for the nulling procedure. Such adjustments or switching is also time consuming and in some cases prone to operator error.

Further, gyroscopic inclination sensors have been employed particularly in moving frames of reference such as aircraft and ships. Such instruments are quite adequate for their intended purpose, mainly the indication of relative inclination. However, gyroscopic inclination sensors are subject to error as a result of bearing friction such that they are not adequate for precise measuring.

SUMMARY OF THE INVENTION

The present invention seeks to overcome many of the disadvantages of prior inclination sensing instruments. A sensor element provides variations in the voltage level of a pair of signals as the sensor is inclined within a limited range of inclination. The variations in voltage levels are converted to digital words which are further translated into angle readings by means of a computer including a memory storing a look-up table of digital words representing increments of inclination within the useful range of the sensor.

OBJECTS OF THE INVENTION

The principal objects of the present invention are: to provide an improved method for determining the inclination of a surface with respect to a horizontal plane referenced to the direction of gravitational force; to provide such a method including the generation of voltage levels indicative of the tilt of the surface about two mutually perpendicular horizontal axes and the conversion of the voltage levels into digital representations thereof; to provide such a method employing an indicator unit including a computer calibrated exclusively to a given sensor element such that the digital representations of the voltage levels generated thereby are converted to accurate angular readings; to provide such a method wherein the angle readings may be given in either of two coordinate systems; to provide such a method wherein two sets each of a sensor unit and indicator unit are interconnected for measuring the difference of the angles of inclination between two remotely located surfaces; to provide such a method wherein the angle readings of a sensor and indicator unit may be averaged over a selected time interval to minimize errors resulting from vibrations or recurring motion; to provide an apparatus for practicing such a method; to provide such an apparatus wherein the calibration of the indicator unit for its associated sensor is implemented by means of a look-up table stored in a memory of the indicator unit; and to provide such an inclination sensing apparatus which is comparatively economical to manufacture, accurate and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
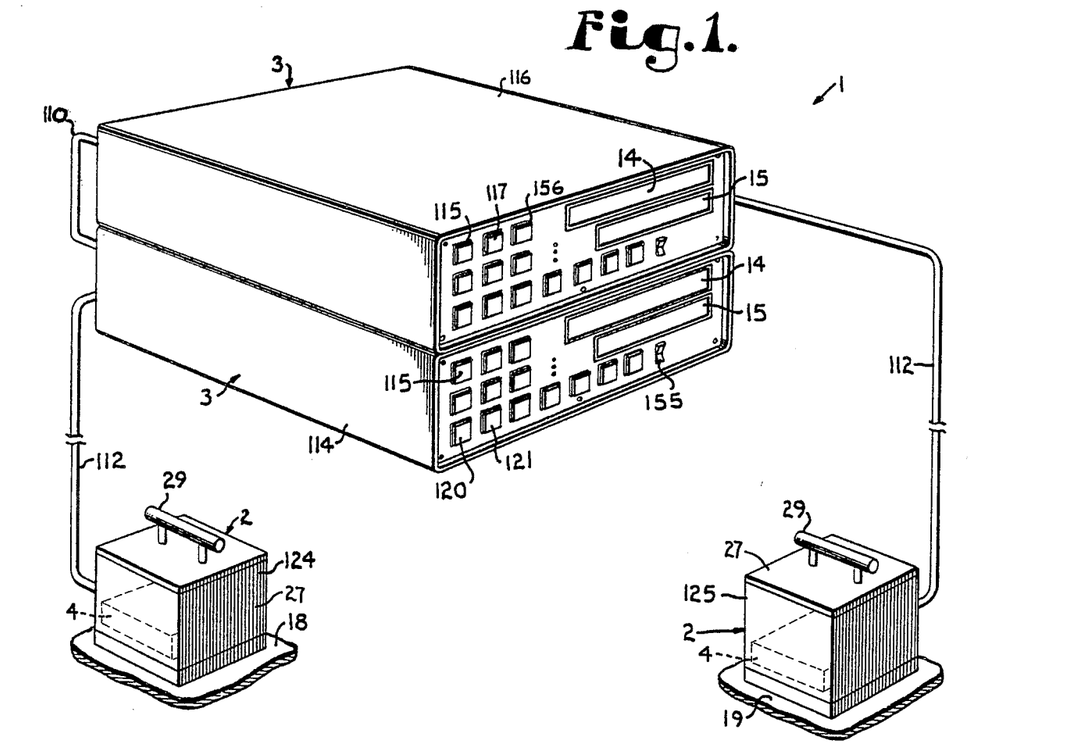
FIG. 1 is a perspective view of two sets of an inclination sensor unit and indicator unit according to the present invention.

Referring to the drawings in more detail:

The reference numeral 1, FIG. 1, generally designates a dual axis inclination measuring apparatus, instrument, or system including at least one sensor unit 2 and an indicator unit 3. The sensor unit 2 generally includes a dual axis transducer or sensor element 4 which cooperates respectively with first and second detector circuits such as bridge circuits 5 and 6, FIG. 3, to generate a pair of electrical signals proportional in level to the inclination of the sensor element 4 respectively about first and second mutually perpendicular axes 7 and 8, FIGS. 4 and 5. The sensor unit 2 generally includes digital conversion circuitry 10, FIG. 3, for converting the electrical signals to digital words for processing by a computer 12 to translate the words to respective angle readings for display on digital display devices 14 and 15, FIG. 2.

Figure 2:
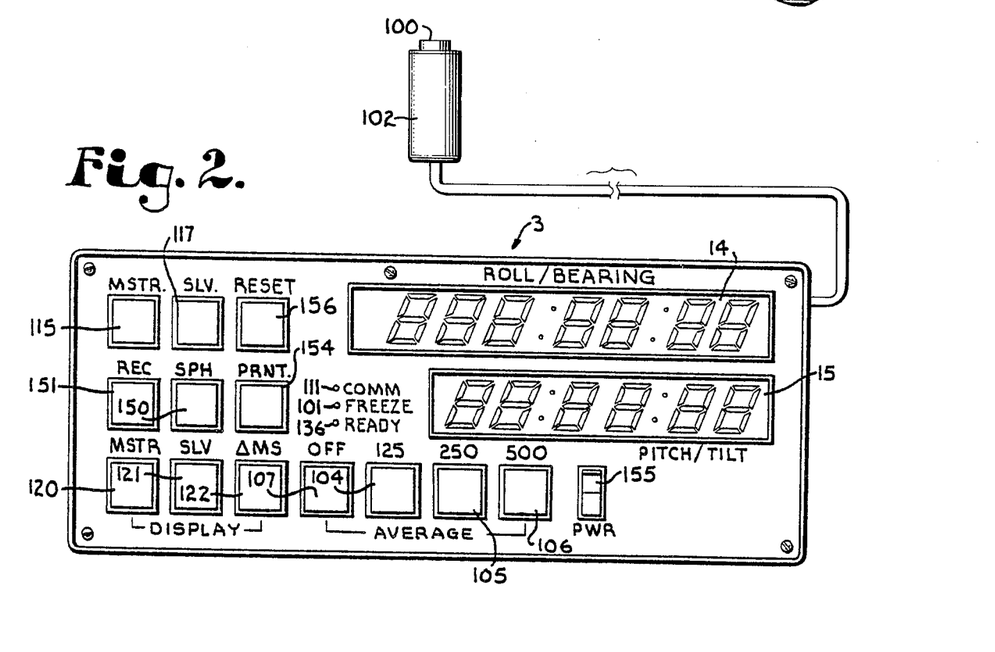
FIG. 2 is an enlarged elevational view of a control panel of the indicator unit.
Figure 4:
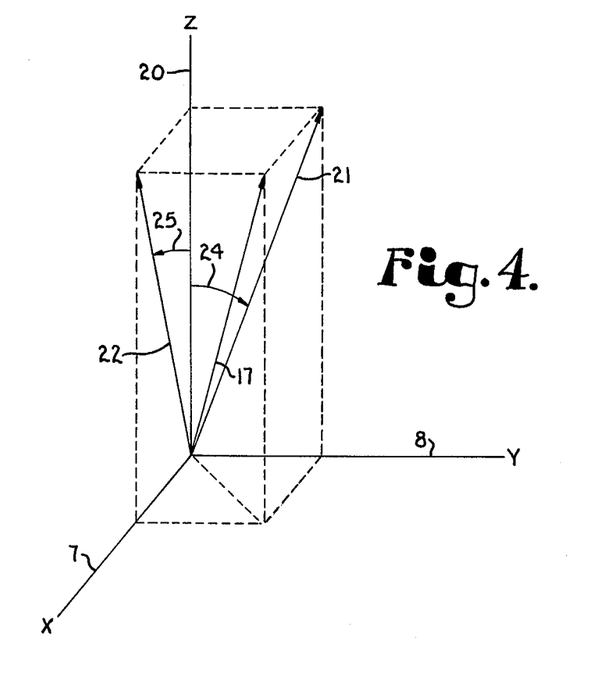
FIG. 4 is a perspective view illustrating the principal parameters of a rectangular Cartesian coordinate system.

Referring to FIG. 4, the instrument 1 is operative to determine and display the angular disposition of a normal vector 17 of a surface 18 or 19, FIG. 1, in relation to a vertical or Z axis 20. The two mutually perpendicular horizontal axes, X axis 7 and Y axis 8, together with the vertical Z axis 20 define a three dimensional rectangular Cartesian coordinate system. A normal vector is used to specify the spatial orientation of a surface or plane, being normal or perpendicular thereto, and often has a magnitude of unity. In the preferred mode of operation of the instrument 1, the normal vector 17 is resolved into a first component vector 21 in the Y-Z plane and a second component vector 22 in the X-Z plane. The angle readings which are displayed on the display devices 14 and 15 are respectively a first angle 24 and a second angle 25. The angle 24 is the angle between the first component vector 21 and Z axis 20 and, further, represents the inclination of the sensor element 4 about the X axis 7. Similarly, the angle 25 is the angle between the second component vector 22 and the Z axis and represents the inclination of the sensor element 4 about the Y axis 8.

The sensor element 4 may be any type of dual axis transducer device which is operative to vary an electrical parameter in proportion to the angles of inclination thereof about the horizontal X and Y axes respectively, 7 and 8. The electrical parameter may be resistance, capacitance, or inductance or combinations thereof. As illustrated in FIG. 1, the sensor element 4 is positioned within the housing 27 of the sensor unit 2 such that the element 4 is level when a lower surface of the housing 27 is level. The housing 27 preferably includes a handle 29 to facilitate handling and placement of the sensor unit 2.

Figure 3:
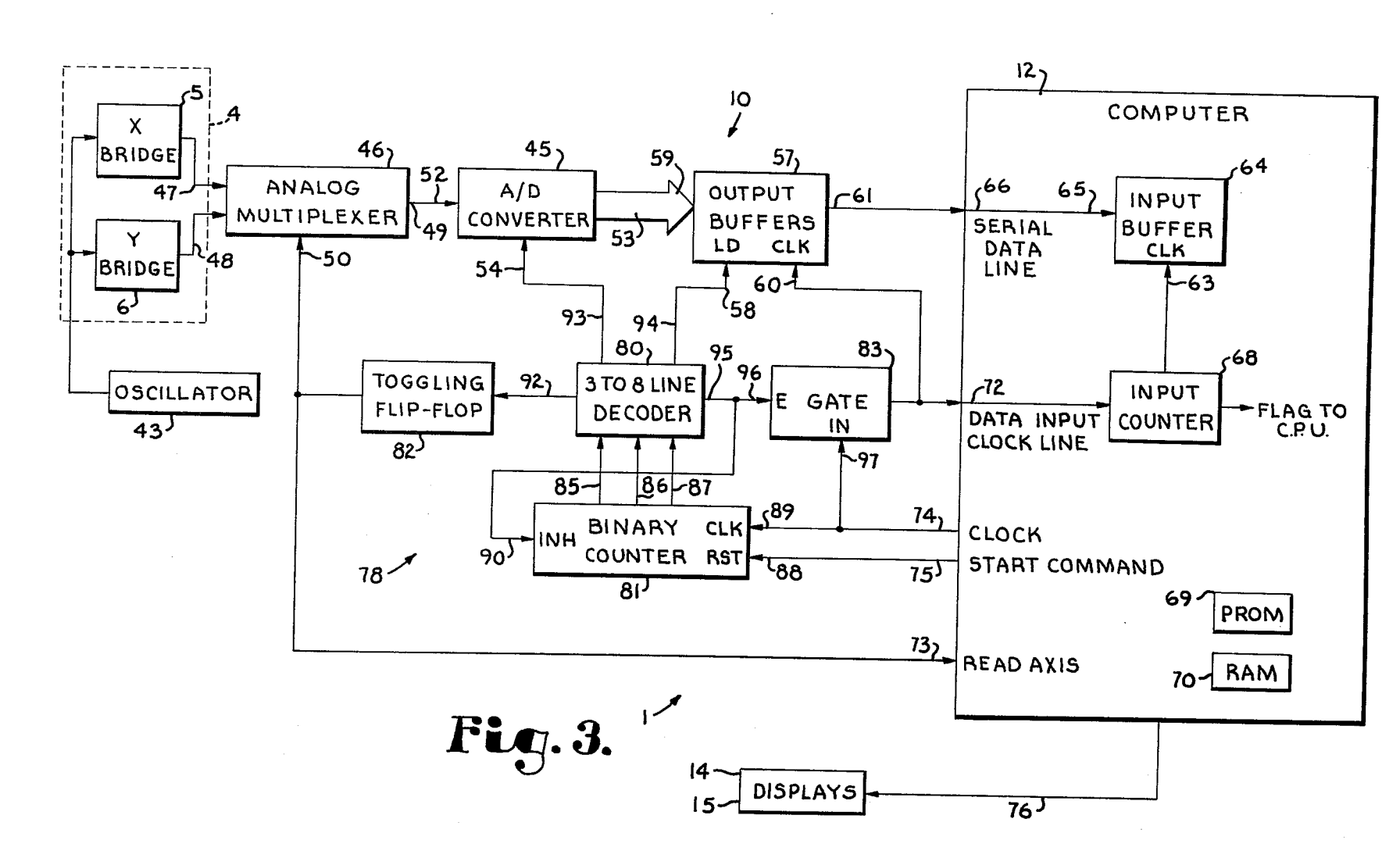
FIG. 3 is a block diagram illustrating the principal functional portions of the inclination measuring apparatus.

Referring to FIG. 3, the X and Y bridge circuits 5 and 6 may be any type of detector circuits which are compatible with the type of sensor element 4 employed. The sensor element 4 includes circuit elements therein which are connected in the respective bridge circuits 5 and 6 and which vary upon inclination of the sensor unit 2 about the X and Y axes 7 and 8 thereby unbalancing the respective bridge circuits 5 and 6. Preferably, each bridge circuit is a rectifying AC excited bridge driven by an oscillator 43 and provides a pair of DC X and Y output voltages which vary in level in proportion to the respective changes in the electrical parameter within the sensor element 4 upon being inclined. The bridge circuits 5 and 6 preferably include amplifiers (not shown) for scaling purposes so that the output signals vary within a desired voltage range.

The voltage level outputs of the X and Y bridge circuits 5 and 6 are converted to digital or binary words by the analog-to-digital (A/D) converter 45 for processing by the computer 12. The individual output signals from the bridges 5 and 6 are alternately fed to the A/D converter 45 by means of an analog multiplexer 46. The multiplexer 46 receives the output from the X bridge 5 on a first signal input 47 and the output from the Y bridge 6 on a second signal input 48. The multiplexer 46 provides at a signal output 49 the analog signal which is present at one of the signal inputs, for example input 47, for a given logic level present at a control input 50 of the multiplexer. When the logical complement of the given logic level is present at the control input 50, the other signal input 48 is selected such that the signal present at input 48 is conveyed to the output 49. The manner of generating the control signal at the control input 50 is set forth hereinbelow.

The analog-to-digital converter 45 may be any one of several types of analog-to-digital converters which is compatible with the remaining components of the circuitry of the instrument 1. Preferably, the illustrated A/D converter 45 is of the successive approximation type with a sixteen bit digital output. The A/D converter 45 is operative to convert each of the analog voltage levels provided by the X and Y bridges 5 and 6, as applied one at a time by the multiplexer 46, to a sixteen bit digital word representative of the voltage level applied to the analog input 52 of the converter 45. The digital word is available at a sixteen bit parallel digital output 53. The conversion process is initiated upon the arrival at the control input 54 of an appropriate logic level.

After conversion of the analog voltage to the digital word, the digital word is loaded into an output buffer register 57 upon receipt of a load signal of the appropriate logic level at a load control terminal 58. The register 57 may be any type of parallel-in/serial-out binary register having a capacity of sixteen bits. The parallel input 59 of the buffer 57 is connected to the output 53 of the converter 45. At the proper time as controlled by the circuitry 10, clock pulses are applied to the clock input 60 of the buffer 57 and to the clock input 63 of an input buffer 64 within the computer 12 in order to clock the digital word out of the output buffer 57, one bit for each clock pulse, and into the input buffer 64.

The input buffer 64 is similar in many respects to the buffer 57 except that the buffer 64 is a serial-in/parallel-out register. The serial output 61 of the buffer 57 is connected to the serial input 65 of the buffer 64 by means of a serial data bus or line 66. The input buffer 64 is addressed as an input/output (I/O) port by the computer 12 in order to retrieve the digital word for further processing.

The computer 12 may be any type of suitable digital computer including a central processing unit, such as a microprocesser (not shown), and support circuitry (also not shown). The illustrated computer 12 particularly includes the input buffer 64; an input counter 68; a read-only memory, such as a programmable read-only memory (PROM) 69; and a random access read-write memory (RAM) 70. The computer 12 is preferably a dedicated computer, that is, a computer specifically adapted and wired for use as part of the inclination sensing instrument 1. The computer 12 has a plurality of connections including, but not limited to, the serial data line 66, the data input clock line 72, and a read axis line 73, all as inputs; and a clock line 74, a start command line 75, and a display output line 76, all as outputs.

The selection of which bridge circuit is to be read, the initiation of the digital conversion process, and the loading of the digital word into the computer 12, are all controlled by the computer 12 through digital control circuitry 78 of the instrument 1. The control circuitry 78 includes a line decoder 80, a binary counter 81, a toggling flip-flop 82, and a logic gate 83. The illustrated counter 81 has three output lines 85, 86, and 87 on which are placed a combination of all logic zeros, for the three bit binary number equal to zero, upon receipt of the start command pulse of the proper logic level at a reset input 88 of the counter 81. Thereafter, each time a clock pulse is received on the clock input 89 of the counter, the binary number on the output lines, 85, 86 and 87 is incremented by one. The counter 81 may be prevented from counting further by placement of a pulse of the proper logic level on an inhibit input 90 of the counter 81.

The line decoder 80 has the outputs 85, 86, and 87 of the counter 81 connected thereto as inputs and is operative to activate or place a selected logic level on a respective output line of the decoder for each combination of logic levels possible on the inputs 85, 86, and 87. The illustrated decoder 80 is a three-to-eight line decoder with only four of the output lines in use. A first output line 92 is connected to the flip-flop 82; a second output line 93 is connected to the control input 54 of the A/D converter 45; a third output line 94 is connected to the load control terminal 58 of the output buffer 57; and a fourth output line 95 is connected to an enable input 96 of the gate 83 and to the inhibit input 90 of the counter 81.

The counter 81 places the condition of 000 on its outputs upon receiving a start command pulse. A first clock pulse thereafter causes output of the counter to be incremented to 001 which causes the first decoder output line 92 to be activated. Activation of the decoder line 92 causes the flip-flop 82 to change the logic state of its output which in turn causes the multiplexer 46 to select the bridge circuit opposite of the one most previously selected. By this means, the analog output of one of the bridge circuits, for example, the X bridge 5, is made available to the A/D converter 45. Since the output of the flip-flop 82 is connected to the read axis input 73 of the computer 12, as the multiplexer 46 is switched, information as to which axis is being read is made available to the computer so that the digital word to be generated will be routed properly.

As the second clock pulse is received by the counter 81, the output is incremented to 010 (decimal 2) whereby the decoder line 92 is deactivated and the second decoder line 93 is activated, thereby causing the digital conversion of the analog voltage level of the X bridge 5 by the A/D converter 45. The digital word representative of the voltage level generated by the X bridge is available at the output 53 of the converter 45. Upon the third clock pulse at the clock input 89 of the counter, the output is incremented to 011 (decimal 3) whereby the decoder line 93 is deactivated and the third decoder line 94 is activated to load the digital word into the output buffer 57.

As the fourth clock pulse of the cycle is received by the counter 81, the third decoder line 94 is deactivated, and the fourth decoder line 95 is activated. The logic level at the output 95 is communicated to the enable input 96 of the gate 83 and to the inhibit input 90 of the counter 81. Inhibiting the counter 81 causes it to ignore forthcoming clock pulses until a reset pulse is received at the reset input 88 of the counter 81. Enabling of the gate 83 routes the clock pulses through the input 97 of the gate to the clock input 60 of the output buffer 57 and to the clock input 63 of the input buffer 64 by way of the input counter 68. The logic gate 83 may be any type of logic gate which is consistent with the logic design of the circuitry 78.

Applying pulses to the clock input 60 of the output buffer 57 causes shifting of the sixteen bit digital word out of the buffer 57 one bit per clock pulse. Similarly, applying pulses to the clock input 63 of the input buffer 64 causes shifting of the bits of the sixteen bit digital word into the buffer 64. The counter 68 counts the clock pulses passing therethrough to the input buffer 64; and when the sixteen bits of the digital word have been counted, the counter 68 sends a pulse or flag to the CPU of the computer 12 to signal that the input buffer 64 has been completely loaded with the sixteen bit digital word representative of the inclination of the sensor element 4 about the X axis 7.

When the CPU of the computer 12 has been flagged, the computer 12 retrieves the digital word therefrom and stores same at a selected address in the RAM 70 for subsequent conversion to an angle reading. After the current digital word has been stored in the RAM 70, the computer 12 sends a start command or reset pulse to the reset input 88 of the binary counter 81, and the whole process is repeated, such that the voltage level generated by the Y bridge 6 is converted to a digital word for conversion to an angle reading. When the decoder line 92 is selected by the decoder 80, the output logic level of the flip-flop 82 is complemented such that the multiplexer 46 makes the Y bridge voltage level, present at the input 48 of the multiplexer, available at the output 49 thereof for conversion by an A/D converter 45.

The program for operating the instrument 1 is stored on a read-only memory within the computer 12. Any type of read-only memory may be employed; and preferably, a programmable read-only memory (PROM), such as the PROM 69 is used to store the control program. Further, the PROM 69 may be used to store a look-up table for calibrating the instrument 1. The PROM 69 and the RAM 70 each may consist of a plurality of integrated circuits or chips. The PROM 69 and RAM 70 are located within the range of addresses which the computer 12 has the ability to address.

Because of manufacturing tolerances, there will be slight variations in the electrical responses of the sensor elements 4 to a given inclination. Further, there will be slight differences in the other electrical components of the bridge circuits 5 and 6. In order to attain the highest degree of precision from each instrument 1 and ensure consistancy of operation, each computer 12 is preferably calibrated for operation exclusively with a single sensor unit 2.

The exemplary analog-to-digital converter 45 makes 192 conversions per second, alternating between the X and Y bridges 5 and 6. The computer 12 stores 32 successive test digital words for each axis; and the computer 12 determines the binary average of the 32 test words and then consults the look-up table in the PROM 69 to convert the averaged test word to one of the angle readings 24 or 25. The computer 12, therefore, updates each of the displays 14 and 15 three times per second.

Averaging the test words results in greater accuracy since the effects of system noise are lessened over the averaging time interval.

Referring to FIG. 2, the indicator unit 3 preferably includes a freeze switch 100 which is operable to freeze the displays 14 and 15 for reading by a human operator. Since the displays 14 and 15 are updated at one-third second intervals, the displays would otherwise tend to flicker, especially in the less significant digits, and would be difficult to read by a human operator. Operation of the freeze switch 100 causes the angle readings which are current as the switch 100 is pressed to be stored in the RAM 70 and appear to be displayed continuously without updating. The freeze indicator light 101 advises the operator that the indicator unit 3 is in the freeze mode. Pressing the freeze switch 100 while in the freeze mode causes exiting of the freeze mode, and updating of the displays 14 and 15 resumes. Exiting of the freeze mode is indicated by the freeze indicator light 101 being extinguished. The freeze switch 100 may be provided on the panel of the indicator unit 3 or, as illustrated, in a remote freeze switch unit 102.

The instrument 1 is capable of averaging readings for each axis over a relatively long interval to nullify or minimize the effects of mechanical vibrations and periodic motions such as occur on an oceangoing vessel or platform. The indicator unit 3 includes a 125 second average switch 104, a 250 second average switch 105, a 500 second average switch 106, and an OFF switch 107 for exiting the averaging mode. Upon operating one of the averaging switches 104–106, the test digital words are stored until thirty-two have been received and then averaged to result in the normal averaged test digital words. Each averaged test digital word is then stored in the RAM 70 throughout the averaging interval, as determined by which average switch 104–106 has been pressed. At the end of the averaging interval, a binary average of the averaged digital words is determined. The resultant average is applied to the look-up table in the PROM 69 to determine the angle reading corresponding thereto. If it is desired to exit the averaging mode before the end of the averaging period, the OFF switch 107 may be pressed, and the displays 14 and 15 are again updated at one-third second intervals.

Referring to FIGS. 1 and 2, the instrument 1 is particularly adapted for use in pairs thereof to indicate the difference in inclination of two remote surfaces 18 and 19 with respect to two parallel sets of mutually perpendicular horizontal axes. One of the surfaces, for example, surface 18, may be a datum or reference platform, as on a ship; and the other surface 19 may be a surface on a structure, such as antenna structure, which is to be aligned relative to the reference surface 18. The two indicator units 3 are interconnected by means of a cable 110. Each indicator unit 3 has a communication indicator light 111 which is illuminated when the two indicator units 3 are in proper communication. The illustrated indicator light 111 on each unit 3 may be operative to blink if the two indicator units 3 are in proper communication but the associated sensor unit 2 is not sending data thereto because of a fault in the cable 112 connecting the sensor unit 2 to the associated indicator unit 3.

When the indicator units 3 have been interconnected, one of the units, preferably the indicator unit 114, is designated the master unit by operating the master designation switch 115 on the unit; and the other unit, indicator unit 116, is designated the slave unit by operating the slave designation switch 117. The indicator units 114 and 116 are preferably identical, but designating one the master and the other the slave unit determines which one is the reference unit for differencing purposes. It is also possible to operate each unit as a master unit by operating the master designation switch 115 on each.

Each indicator unit 3 includes three display mode switches: a master display switch 120, a slave display switch 121, and a difference display switch 122. Operation of the master display switch 120 on the master indicator unit 114 causes the angle readings, as determined by the master sensor unit 124 connected thereto, to be displayed on the display devices 14 and 15 of the master indicator unit 114. Operation of the slave display switch 121 on the master indicator unit 114 causes the angle readings, as determined by the slave sensor unit 125, to be displayed on the master indicator unit 114. Operation of the difference display switch 122 on the master indicator unit 114 causes the angle readings of the master unit to be subtracted from the angle readings of the slave unit and the difference angle readings to be displayed on the master unit 114. In a similar manner, the master, slave and difference angle readings may be displayed on the display devices 14 and 15 of the slave indicator unit 116 by operation of the appropriate display switches 120–122.

The indicator units 114 and 116 may be connected to an alarm system (not shown) such that a difference angle reading in excess of a selected angle would cause an alarm to sound. Such a setup would be useful, for example, on a large oceangoing tanker ship. Such ships are subject to a degree of flexure and torque due to wave action because of the extreme length of the hull structure. The master sensor unit 124 could be positioned on a reference platform 18 of the tanker, and the slave sensor unit 125 could be placed on a surface at one of the extremities of the tanker. The alarm system would be set to sound at a critical degree of flexure so that speed could be reduced or direction changed to avoid overstressing the hull which could ultimately lead to failure and loss of the ship and cargo.

The differencing feature of the instrument 1 greatly facilitates the alignment of substructures of a ship at sea, since the effects of rolling and pitching of the ship are nullified. The substructure may be coarsely aligned or positioned using conventional leveling instruments, then finely aligned by adjusting the substructure until the difference angle readings are substantially zero.

Referring to FIGS. 1 and 3, the housing 27 has the sensor element 4, the bridge circuits 5 and 6, the digital conversion circuitry 10, and the digital control circuitry 78 mounted therein. Intercommunication between the sensor unit 2 and indicator unit 3 is accomplished by digital signals only to thereby increase accuracy and reliability.

Figure 5:
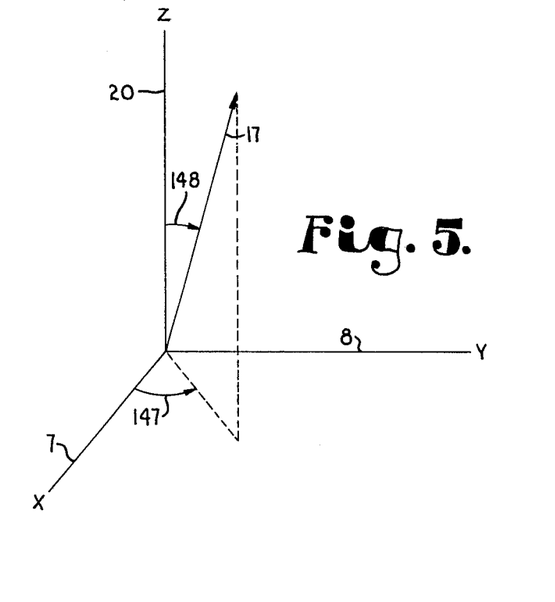
FIG. 5 is a view similar to FIG. 4 and illustrates the principal parameters of a spherical coordinate system.

Referring to FIGS. 3, 4 and 5, the instrument 1 is adapted to read out in the angles of the normal vector components 21 and 22 with respect to the Z or vertical axis 20, that is respectively, the angles 24 and 25. The angle 24 is designated a roll angle, or inclination from side to side, and displayed on the display device 14. The angle 25 is designated a pitch angle, or inclination fore and aft, and displayed on the display device 15. Such angles are referred to as rectangular components and are defined with respect to the rectangular coordinate system illustrated in FIG. 4.

The instrument 1 is also adapted to read out in the angles of a spherical coordinate system, FIG. 5. The angles of interest in the spherical coordinate system are a bearing angle 147, which is the angle between the X axis 7 and the plane containing the normal vector 17 and the Z axis 20, and a tilt angle 148 which is the true angle between the normal vector 17 and the Z axis 20. In some circumstances, use of the spherical coordinate angles 147 and 148 is more convenient than the rectangular coordinate angles 24 and 25.

Upon power-up, the instrument 1 is in the rectangular coordinate mode. The spherical coordinate mode may be selected by operating the spherical mode switch 150. The instrument 1 may be returned to the rectangular mode by operation of the rectangular mode switch 151. The preferred embodiment of the instrument 1 always measures inclination in terms of the rectangular coordinate angles 24 and 25. When the spherical mode is selected, the control program causes the rectangular coordinate angles 24 and 25 to be converted to the spherical coordinate angles 147 and 148 by the use of conventional trigonometric identities. The bearing angle 147 is displayed on the display device 14, and the tilt angle 148 is displayed on the display device 15.

As illustrated in FIG. 3, a print switch 154 is provided to cause the angle readings which are displayed on the devices 14 and 15 to be printed along with, for example, the time and date that the readings are taken. This provides a permanent record of the inclinations measured by the instrument 1. Pressing the print switch 154 actuates a printer (not shown) which is connected to the indicator unit 3. Pressing the print switch while in the print mode causes exiting of the print mode and deactivation of the printer. The indicator unit 3 includes a power switch 155 for applying electrical power to the instrument 1. Upon powerup, the computer 12 is reset and begins execution of the control program. The indicator unit 3 may also be provided with a separate reset switch 156 for operation in the event that obvious errors are noticed in the displayed readings due to causes such as power line transients or surges.

The sensor unit 2 and indicator unit 3 are described and illustrated as being constructed in separate housings. However, under some circumstances, it might be desirable to provide the sensor unit 2 and indicator unit 3 in a single housing. Further, each indicator unit 3 is illustrated as having a single sensor unit 2; however, it would be conceivable to connect several sensor units 2 to a single indicator unit 3 along with suitable switching circuitry for activating and taking readings with the selected sensor unit 2. In addition, it might be necessary to provide some kind of memory bank selecting circuitry and software to provide sufficient memory space for the computer 12 of the indicator unit 3 of such an arrangement.

While certain forms of the present invention have been described and illustrated, it is not to be limited thereto except insofar as such limitations are included in the following claims.

What is claimed and desired to secure by Letters Patent is:

1. A method for determining and indicating the inclination of a surface with respect to horizontal comprising the steps of:
   (a) generating a pair of electrical signals each having a signal property which varies from a reference value at horizontal in proportion to the inclination of a surface about two respective mutually perpendicular horizontal axes;
   (b) converting each electrical signal to a digital word representative of the variation of said signal property of said signal;
   (c) translating each digital word to an angle reading associated with said digital word, said angle reading being equivalent to the inclination of said surface about a respective one of said horizontal axes; and
   (d) displaying such an angle reading for each of said pair of electrical signals.

2. The method set forth in claim 1 wherein:
   (a) the pair of angle readings for said pair of electrical signals is a pair of first angle readings and indicate the inclination of a first surface with respect to a first set of horizontal axes; and including the steps of:
   (b) generating a pair of second electrical signals proportional in said signal property respectively to the inclination of a second surface with respect to a second set of mutually perpendicular axes parallel to said first set of horizontal axes;
   (c) converting said second electrical signals to respective second digital words respresentative of the variation of said signal property thereof;
   (d) translating said second digital words to a pair of second angle readings represented respectively by said second digital words;
   (e) in a computer means, subtracting one of said pairs of angle readings respectively from the other of said pairs of angle readings resulting in a pair of difference angle reading equivalent to the difference in inclinations of said first and second surfaces with respect to said first set of horizontal axes; and
   (f) displaying said pair of difference angle readings.

3. The method set forth in claim 1 including, for each of said electrical signals, the steps of:
   (a) in a memory means of a computer means, storing over a selected period of time successive digital words corresponding to angles of inclination of said surface about the horizontal axis associated with said electrical signal;
   (b) in said computer means, calculating an average digital word equal to the average of the binary values of said successive digital words; and
   (c) displaying an average angle reading corresponding to said average digital word.

4. The method set forth in claim 1 wherein:
   (a) the displayed angle readings are periodically updated at a rate which is too fast for visual perception by an average human; and including the steps of:
   (b) selectively operating a freeze switch to cause the storing in a memory a pair of angle readings which are current upon the operation of said freeze switch; and
   (c) displaying the stored pair of angle readings.

5. The method set forth in claim 1 including the step of selectively converting the pair of angle readings into a second pair of angle readings in a spherical coordinate system.

6. The method set forth in claim 1 wherein:
   (a) said electrical signals are generated continuously and simultaneously; and
   (b) said electrical signals are converted to digital words one at a time.

7. The method set forth in claim 1 wherein said pair of electrical signals are generated continuously and simultaneously and including in a repeating timed sequence the steps of:
   (a) converting a first electrical signal of said pair to a first digital word;
   (b) loading said first digital word into to an output buffer register;
   (c) transferring said first digital word to an input buffer register within a computer;
   (d) converting a second electrical signal of said pair to a second digital word;
   (e) loading said second digital word into said output buffer register; and
   (f) transferring said second digital word to said input buffer register.

8. The method set forth in claim 7 wherein each of said first and second digital words are transferred from said output buffer register to said input buffer register in a serial manner.

9. An apparatus for determining and indicating the inclination of a surface from horizontal comprising:
   (a) a dual axis inclination sensing means for placement on a surface to determine the inclination thereof and operative to vary an electrical parameter in proportion to the degree of inclination of said sensing means about each of a pair of mutually perpendicular horizontal axes;
   (b) circuit means having said sensing means connected thereto and operative to provide a pair of electrical signals, each signal having a signal property which varies in proportion to the variation of said electrical parameter upon inclination of said sensing means about a respective one of said horizontal axes;
   (c) analog-to-digital (A/D) converter means operatively connected to said circuit means and converting each signal to a digital word having a binary value representative of the variation of said signal property of said signal from a reference value thereof;
   (d) computer means operatively connected to said A/D converter means and operative to convert each digital word to an angle reading associated therewith; and
   (e) display means connected to said computer means and operative to display a pair of angle readings equivalent respectively to the inclination of said sensing means about said horizontal axes.

10. The apparatus set forth in claim 9 wherein:
   (a) said inclination sensing means is a selected inclination sensing means; and
   (b) said computer means is calibrated exclusively for said selected inclination sensing means.

11. The apparatus set forth in claim 9 wherein said circuit means includes:
   (a) analog multiplexer means having a first signal input, a second signal input, a control input, and a signal output; a first signal of said pair of signals being communicated to said first signal input, a second signal of said pair of signals being communicated to said second signal input, and said signal output being connected to said A/D converter means; said multiplexer means providing a respective one of said first and second signals at said signal output according to the binary logic level of a control signal received at said control input; and
   (b) controlled toggle switch means having a toggle output connected to said control input of said multiplexer means and having a toggle input, said toggle switch means providing a logic level to said control input and being operative to provide thereto the logical complement of the current logic level each time a pulse is received at said toggle input, whereby said multiplexer means is operative to alternate between providing said first signal and said second signal to said A/D converter means.

12. An apparatus as set forth in claim 11 including:
   (a) first and second bridge circuit means operative to effect the variation of said first and second signals in response to the inclination of said sensing means respectively about a first axis and a second axis of said pair of horizontal axes; and
   (b) said first and second bridge circuit means being connected respectively to said first and second signal inputs of said multiplexer means.

13. The apparatus set forth in claim 11 including:
   (a) line decoder means connected by respective circuit lines to said toggle switch means and said A/D converter means and operative to provide on said lines one at a time a selected logic level in response to a respective combination of logic levels received at a set of inputs of said decoder means; and
   (b) binary counter means connected to said computer means and to said set of inputs of said decoder means and operative to provide to said set of inputs a combination of logic levels representing a binary number and to increment same in response to each pulse of a clock signal received from said computer means.

14. The apparatus set forth in claim 9 wherein:
   (a) said sensing means is a selected inclination sensing means;
   (b) said computer means includes a read-only memory means; and
   (c) said computer means is calibrated for use exclusively with said selected inclination sensing means by a look-up table stored in said read-only memory means.

15. The apparatus set forth in claim 9 wherein said apparatus is a first apparatus for determining the inclination of a first surface with respect to horizontal and including:
   (a) a second apparatus similar to said first apparatus for determining the inclination of a second surface remote from said first surface; and
   (b) difference switch means on at least one apparatus to effect the subtraction of the angle readings of said one apparatus from the angle readings of the other said apparatus resulting in a pair of difference angle readings for display on at least one of said first and second apparatus.

16. The apparatus set forth in claim 9 wherein:
   (a) said computer means includes a read-write memory means; and
   (b) said apparatus includes average switch means to effect:
      (1) the storage in said memory means over a selected period of time a pair of pluralities of said digital words corresponding respectively to inclinations of said sensing means about each of said horizontal axes;
      (2) the calculation of a pair of average digital words equal to the respective averages of the binary values of said pluralities of said digital words; and (3) the display of a pair of average angle readings corresponding respectively to said average digital words.

17. The apparatus set forth in claim 9 wherein:
    (a) said pair of angle readings is updated at a rate which is too fast for visual perception of a pair of updated readings by an average human;
    (b) said computer means includes a read-write memory means; and
    (c) said apparatus includes a freeze display switch means to effect:
       (1) the storage of a pair of angle readings which are current upon operation of said switch means; and
       (2) the display of the stored pair of angle readings.

18. The apparatus set forth in claim 9 including a coordinate conversion switch means to effect the conversion of said pair of angle readings to a pair of second angle readings in a spherical coordinate system.

19. An apparatus for determining and indicating the inclination of a surface from horizontal comprising:
    (a) inclination sensing means for placement on a surface to determine the inclination thereof and operative to vary an electrical parameter in proportion to the degree of inclination of said sensing means about a first axis and a second axis of a pair of mutually perpendicular horizontal axes;
    (b) first and second bridge circuit means having said sensing means connected thereto and operative to vary the voltage of a first electrical signal and a second electrical signal in response to the variation of said electrical parameter upon the inclination of said sensing means respectively about said axes;
    (c) analog multiplexer means having a first signal input, a second signal input, a control input, and a signal output; said first signal being communicated to said first signal input and said second signal being communicated to said second signal input; said multiplexer means providing a respective one of said first and second signals at said signal output according to the binary logic level of a control signal received at said control input;
    (d) analog-to-digital (A/D) converter means connected to said signal output of said multiplexer means and converting the signal at said signal output of said multiplexer means to a digital word having a binary value representative of the variation of the voltage of said signal at said output of said multiplexer means upon receiving a conversion signal of a selected logic level at a conversion enable input of said A/D converter means;
    (e) controlled toggle switch means having a toggle output connected to said control input of said multiplexer means and having a toggle input, said toggle switch means providing a logic level to said control input and being operative to provide thereto the logical complement of the current logic level each time a pulse is received at said toggle input, whereby said multiplexer means is operative to alternate between providing said first signal and said second signal to said A/D converter means;
    (f) line decoder means connected by respective circuit lines to said toggle switch means and said A/D converter means and operative to provide on said lines one at a time a selected logic level in response to a respective combination of logic levels received at a set of inputs of said decoder means;
    (g) binary counter means connected to said set of inputs of said decoder means, having a clock input, and operative to provide to said set of inputs a combination of logic levels representing a binary number and to increment same in response to each pulse of a clock signal received at said clock input;
    (h) computer means having said A/D converter means and said clock input of said binary counter means operatively connected thereto and operative to provide clock pulses to said binary counter means to effect the alternating selection of said first and second signals, the conversion of said signals one at a time to respective digital words, and the translation of said digital words respectively to a first angle reading and a second angle reading; and
    (i) display means connected to said computer means and operative to display said angle readings which are equivalent respectively to the inclination of said sensing means about said horizontal axes.

20. A method for determining and indicating the inclination of a surface with respect to a horizontal axis comprising the steps:
    (a) generating an electrical signal having a signal property which varies from a reference value at horizontal in proportion to the inclination of a surface about a horizontal axis;
    (b) converting said signal to a digital word representative of the variation of said signal property from said reference value;
    (c) translating said digital word to an angle reading associated with the binary value of said digital word, said angle reading being equivalent to the inclination of said surface about said axis; and
    (d) displaying said angle reading.

21. The method set forth in claim 20 wherein:
    (a) said surface is a first surface, said axis is a first horizontal axis, and said angle reading is a first angle reading and indicates the inclination of said first surface about said first axis; and including the steps of:
    (b) generating a second electrical signal having said signal property which varies in proportion to the inclination of a second surface about a second horizontal axis parallel to said first axis;
    (c) converting said second signal to a second digital word representative of the variation of said signal property of said second signal from said reference value;
    (d) translating said second digital word to a second angle reading associated with the binary value of said second digital word;
    (e) in a computer means, subtracting one of said angle readings from the other of said angle readings resulting in a difference angle reading equivalent to the difference in inclinations of said first and second surfaces respectively about said first and second axes; and
    (f) displaying said difference angle reading.

22. The method set forth in claim 20 including the steps of:
    (a) in a memory of a computer, storing over a selected period of time successive digital words corresponding to angles of inclination of said surface about said axis;
    (b) in said computer, calculating an average digital word equal to the average of the binary values of said successive digital words;
    (c) translating said average digital word to an average angle reading; and
    (d) displaying said average angle reading.

* * * * *